Sept. 11, 1962     S. PIERCE     3,053,224
HORSE TRAILER
Filed April 19, 1960     2 Sheets-Sheet 1
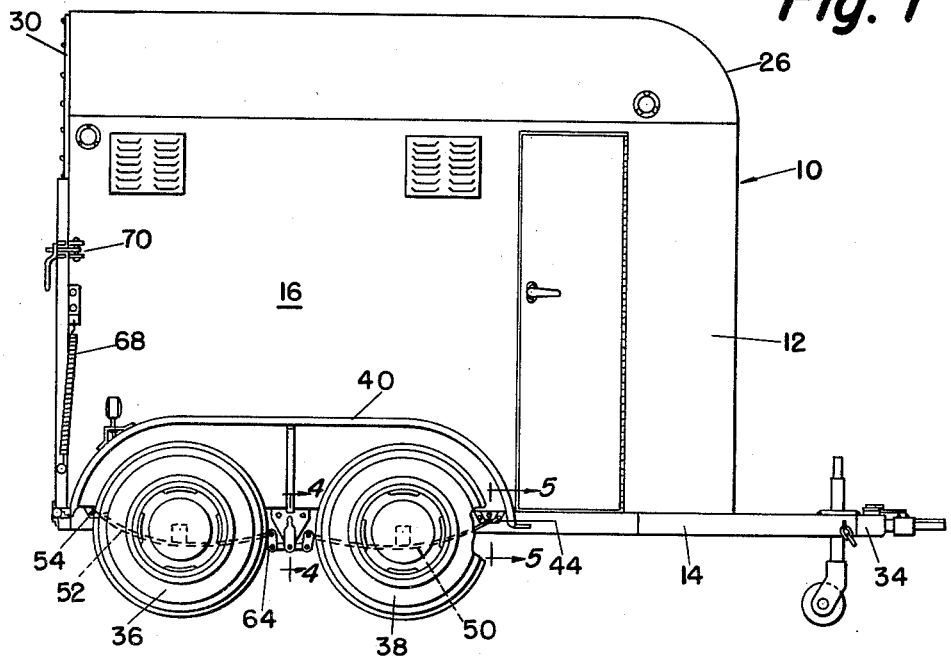
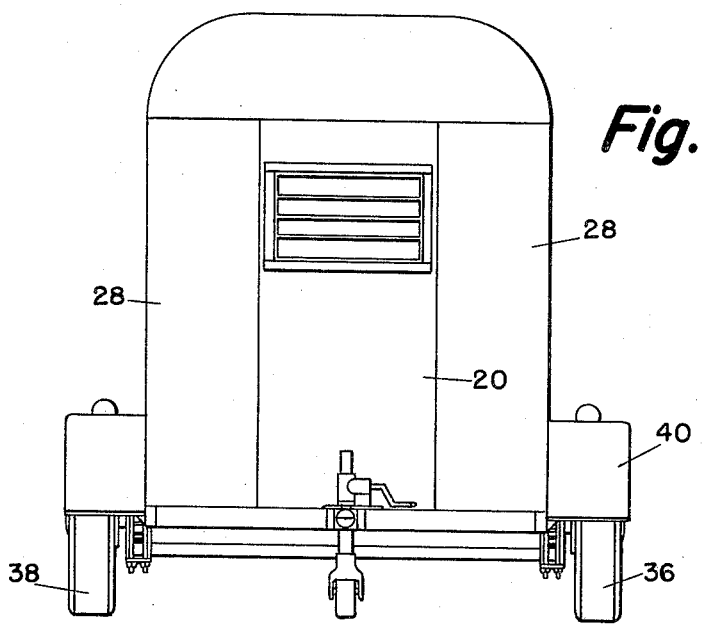
INVENTOR.
SAMUEL PIERCE
BY
*Arthur H. Seidel*
ATTORNEY Sept. 11, 1962 S. PIERCE 3,053,224
HORSE TRAILER
Filed April 19, 1960 2 Sheets-Sheet 2
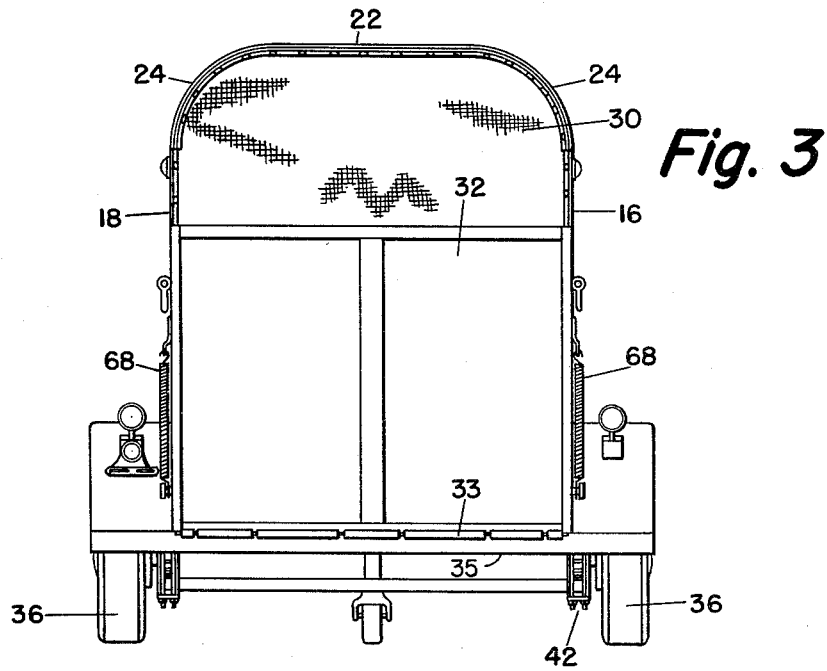
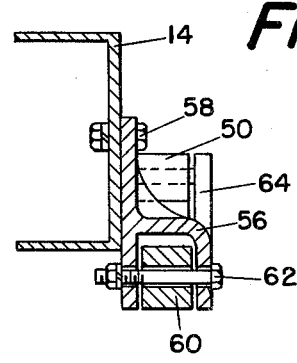
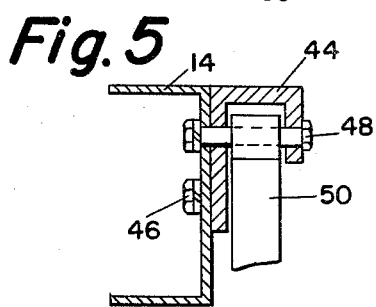
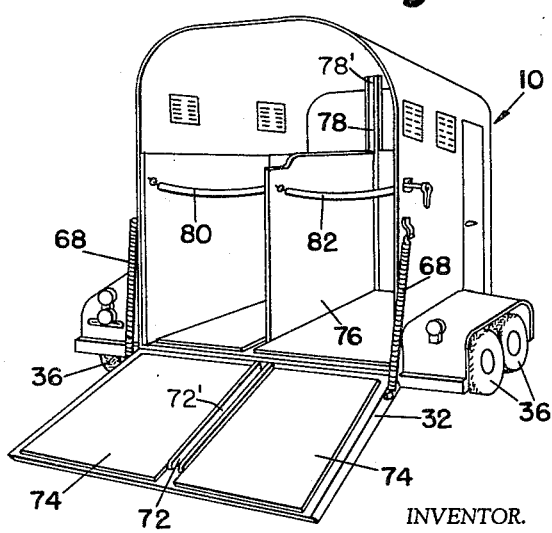
INVENTOR.
SAMUEL PIERCE
BY
Arthur H. Seidel
ATTORNEY United States Patent Office 3,053,224
Patented Sept. 11, 1962

3,053,224
HORSE TRAILER
Samuel Pierce, Silverdale, Pa., assignor to Hartman Trailer Manufacturing Company, Inc., Perkasie, Pa., a corporation of Pennsylvania
Filed Apr. 19, 1960, Ser. No. 23,224
4 Claims. (Cl. 119—7)

This invention relates to horse trailers, and more particularly to an enclosed horse trailer capable of being pulled by a vehicle.

The horse trailers used heretofore suffer from any defects. The horse trailers heretofore have not been provided with a movable partition between the horse stalls and are therefore not versatile for every hauling need. The horse trailers used heretofore have been provided with a suspension system which subjects the horses to load vibrations.

It is an object of this invention to overcome the above and other disadvantages of the horse trailers used heretofore.

It is another object of this invention to provide a horse trailer in which road vibrations are drastically reduced thereby giving the horses a smoother ride.

It is another object of this invention to provide a horse trailer having a movable partition so that the horse stalls may be varied in shape as the horses are loaded into the trailer.

It is a still further object of this invention to provide a horse trailer in which it is easier to load the horses into the horse trailer.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevation view of the horse trailer of the present invention.

FIGURE 2 is a front elevation view of the horse trailer of the present invention.

FIGURE 3 is a rear elevation view of the horse trailer of the present invention with the tail gate in its closed disposition.

FIGURE 4 is a partial cross-sectional view taken along lines 4—4 of FIGURE 1.

FIGURE 5 is a partial cross-sectional view taken along lines 5—5 of FIGURE 1.

FIGURE 6 is a perspective view of the horse trailer of the present invention with the tail gate in its open disposition.

Referring to the drawing in detail, wherein like numerals indicate like elements, there is shown in FIGURE 1 a horse trailer of the present invention designated generally as 10.

The horse trailer 10 comprises an enclosed housing 12 and a frame 14. The housing 12 comprises parallel upright side walls 16 and 18, a front wall 20, and a top wall 22. The side walls 16 and 18 are contoured into the top wall 22 by the curved portion 24. The front wall 20 is contoured into the top wall 22 by the curved portion 26. The side walls 16 and 18 are contoured into the front wall 20 by the curved portion 28. A back wall 30 extends across the upper portion of the back of the housing 12. Preferably, the back wall 30 is made of canvas material which is releasably secured to the housing 12. A tail gate 32 is pivotably secured to the housing 12 by hinge 33 along the bottom wall 35 of the housing.

The frame 14 is provided at one end with a trailer hitch 34 and is provided with a pair of wheels 36 and 38 on each side of the housing 12. A fender 40 is fixedly secured to the frame 12 and extends over the wheels 36 and 38 on each side of the housing 12. The wheels 36 and 38 are supported from the frame 14 by a see-saw suspension system 42.

The see-saw suspension system 42 includes a J-shaped bracket 44 as shown more clearly in FIGURE 5. The bracket 44 is fixedly secured at its ends to the frame 14 by bolts 46. A bolt 48 extending through the arms of the J-shaped bracket 44 and the frame 14 pivotably secures one end of leaf spring 50 to the J-shaped bracket 44. A second leaf spring 52 is pivotably secured at one end to a J-shaped bracket 54. The J-shaped bracket 54 is identical with the J-shaped bracket 44.

Intermediate the wheels 36 and 38, an h-shaped bracket 56 is fixedly secured to the frame 14 by a bolt 58 shown more clearly in FIGURES 1 and 4. An arm 60 is pivotably secured intermediate its ends to the h-shaped bracket 56 by a bolt 62. A link 64 extends upwardly from each end of the arm 60. The links 64 are pivotably secured to the other ends of the leaf springs 50 and 52. If wheel 38 is moved upwardly the arm 60 is pivoted about the bolt 62 thereby stressing leaf spring 50. Thus, each leaf spring 50 and 52 absorbs some of the shock due to road vibrations thereby providing a smoother ride for the horses adapted to be transported within the housing 12.

The tail gate 32 is provided with a spring 68 on each side thereof. The springs 68 are fixedly secured at one end to the tail gate 32 and at their other end to the side walls 16 and 18. A latch 70 is provided for holding the tail gate 32 in its closed disposition. As shown more clearly in FIGURE 6, the springs 68 are expanded when the tail gate 32 is in its open disposition. The springs 68 are of insufficient strength to retract the tail gate from its open to its closed disposition. However, when the tail gate is in an intermediate position the springs 68 assist in moving the tail gate 32 to its closed disposition.

As shown more clearly in FIGURE 6, the inner surface of the tail gate 32 is provided with a channel 72 having a groove 72' therein and mats 74 on each side of the channel 72. A partition 76 is provided within the housing 12 and divides the interior of the housing into two horse stalls. The partition 76 is inserted at one end into a channel 78 extending in an upright position on the inside of the front wall 20. The channel 78 has a groove 78' substantially wider than the thickness of the partition 76 so that the partition 76 may be pivoted relative to the channel 78 thereby forming a funnel with one of the side walls to assist the loading of a horse into the trailer 10. When a horse has been loaded into the trailer 10, the partition 76 will then be pivoted in the other direction so that a second horse may be loaded into the trailer 10. The partition 76 then cooperates with the channel 72 so as to remain fixed and divide the interior of the housing 12 into two equal stalls. A padded cable 80 extends from the upper ridge of the partition 76 to the side wall 18. A padded cable 82 extends from adjacent to the upper ridge of partition 76 to the side wall 16. The padded cables 80 and 82 are releasably secured to the partition 76 and the side walls 16 and 18. The padded cables 80 and 82 extend across the stalls at a height so that the horse's tail may extend over the padded cables 80 and 82. The presence of the padded cables 80 and 82 under the horse's tail assists in maintaining the horses calm during transportation in the horse trailer 10.

The horse trailer 10 will be used in the following manner:

When it is desired to load horses into the horse trailer 10, the tail gate 32 is lowered to the position as shown in FIGURE 6. Padded cable 80 will be released from its securement with the side wall 18 and the partition 76 will be pivoted toward the side wall 16. A horse will then be led into the housing 12. The provision of mats 74 on the inner surface of the tail gate 32 facilitates the movement of the horse up the tail gate 32 since it provides for a better footing. Since the partition 76 has been pivoted toward the side wall 16, the stall for the first horse will be funnel shaped and therefore will be easier for the horse to be loaded onto the trailer 10. When the first horse has been loaded onto the trailer, the padded cable 82 is released from securement with the side wall 16 and the partition 76 is then pivoted toward the side wall 18 until it abuts the first horse. The second horse is then loaded into the funnel shaped stall and then the partition 76 is pivoted to its intermediate position parallel to the side walls 16 and 18. The free ends of the padded cables 80 and 82 are then secured to the side walls 16 and 18. The horses' tails are draped over the padded cables 80 and 82. Lastly, the tail gate 32 is pivoted to its closed disposition with the partition 76 inserted into the channel 72. With the latch 70 closed, the horse trailer 10 may be secured to a vehicle by the trailer hitch 34.

The present invention may be embodied in other specific forms without departing from the spirit or essential attributes thereof and, accordingly, reference should be made to the appended claims, rather than to the foregoing specification as indicating the scope of the invention.

I claim:

1. A horse trailer comprising an enclosed housing mounted on a frame, a pair of wheels on each side of said housing mounted on said frame by a see-saw suspension system, a tail gate pivotably secured to the rear of said housing along a bottom wall of said housing, a spring means secured at one end to the housing and at its other end to said tail gate, said spring means tending to bias said tail gate to a closed disposition, a partition in said housing dividing said housing into two stalls, a channel having a longitudinal groove therein on the inside of a front wall of said housing receiving one end of said partition, said partition end being of a width less than that of said groove so that said partition can pivot relative to said housing about said one end and thereby change the shape of said stalls, a channel on said tail gate receiving said other end of said partition when in the closed disposition, a padded cable extending from each side of said partition across each stall to a side wall of said housing, said cables being connected to said partition adjacent a top ridge thereof, said padded cables being releasably secured to said partition and said side walls, and a trailer hitch secured to the front end of said frame.

2. A horse trailer in accordance with claim 1 wherein said see-saw suspension system includes a pivotable horizontally disposed arm between said wheels on each side of said housing, an upright link on each end of said arm, a pair of leaf springs, each leaf spring being pivotably secured to the frame on one end, each leaf spring being pivotably secured to said links at its other end, an h-shaped bracket fixedly secured to said frame, said bracket pivotably supporting said arm intermediate the ends of said arm.

3. A horse trailer in accordance with claim 2 wherein said tail gate extends upwardly for a major portion of the height of said housing when said tail gate in its closed disposition, the remaining portion of said housing above said tail gate including a canvas wall releasably secured to the housing.

4. A horse trailer in accordance with claim 3 wherein said housing includes side and front walls contoured into a top wall by curved portions, said side walls being parallel to one another and contoured into the front wall by a curved portion, fenders on said housing above said wheels, and mats on the inner surface of said tail gate.

References Cited in the file of this patent

UNITED STATES PATENTS

| | | |
|---|---|---|
| 1,685,295 | Rodin | Sept. 25, 1928 |
| 2,621,070 | Crivella | Dec. 9, 1952 |
| 2,715,040 | Rhoads | Aug. 9, 1955 |
| 2,825,301 | Quist | Mar. 4, 1958 |
| 2,957,058 | Trott | Oct. 8, 1960 |

FOREIGN PATENTS

| | | |
|---|---|---|
| 527,664 | Canada | July 10, 1956 |